United States Patent
Barron et al.

(10) Patent No.: US 7,276,213 B2
(45) Date of Patent: Oct. 2, 2007

(54) INTERNALLY SHIELDED CATALYTIC CONVERTER

(75) Inventors: Lana Holmblad Barron, Livonia, MI (US); Neil Yiding Zeng, Novi, MI (US); Doug Michael Seifert, Toledo, OH (US)

(73) Assignee: Automotive Components Holdings, LLC, Dearborn, MI (US)

( * ) Notice: Subject to any disclaimer, the term of this patent is extended or adjusted under 35 U.S.C. 154(b) by 856 days.

(21) Appl. No.: 10/375,520

(22) Filed: Feb. 27, 2003

(65) Prior Publication Data

US 2004/0170540 A1  Sep. 2, 2004

(51) Int. Cl.
*B01D 50/00* (2006.01)
(52) U.S. Cl. ..................... 422/179; 422/177
(58) Field of Classification Search ........... 422/179, 422/168, 169, 171, 177, 180, 211, 222, 221
See application file for complete search history.

(56) References Cited

U.S. PATENT DOCUMENTS

| | | | |
|---|---|---|---|
| 4,049,388 A | 9/1977 | Scheitlin et al. | 422/171 |
| 4,218,422 A | 8/1980 | Schock et al. | 422/171 |
| 4,536,371 A | 8/1985 | Thayer et al. | 422/171 |
| 4,900,517 A | 2/1990 | Domesle et al. | 422/171 |
| 5,094,073 A | 3/1992 | Wörner et al. | 60/299 |
| 5,104,627 A | 4/1992 | Usui et al. | 422/171 |
| 5,180,408 A | 1/1993 | Wörner et al. | 55/482 |
| 5,549,873 A | 8/1996 | Pott | 422/180 |
| 5,829,132 A * | 11/1998 | Sickels et al. | 29/890 |
| 5,882,608 A * | 3/1999 | Sanocki et al. | 422/179 |
| 6,001,314 A * | 12/1999 | Buck et al. | 422/177 |

FOREIGN PATENT DOCUMENTS

EP  0569109  * 10/1993

* cited by examiner

*Primary Examiner*—Glenn Caldarola
*Assistant Examiner*—Tom P. Duong
(74) *Attorney, Agent, or Firm*—MacMillan, Sobanski & Todd, LLC

(57) ABSTRACT

The invention relates to a device for treating exhaust gases of internal combustion engines, including a housing, at least one gas treating body, a first support material, an internal shield, and a second support material. The housing includes an inlet, an outlet and an interior chamber between the inlet and the outlet. The gas treating body or bodies are located within the chamber, and the first support material is located between the outer surface of the gas treating body or bodies and the inner surface of the chamber. The internal shield is coupled with the inner surface of the housing via the second support material, which is located between the outer surface of the internal shield and the inner surface of the housing. The cross sectional area of the housing is generally constant in the region proximal to the internal shield.

15 Claims, 2 Drawing Sheets

INTERNALLY SHIELDED CATALYTIC CONVERTER

BACKGROUND OF THE INVENTION

1. Field of the Invention

The invention relates to an emission controlling device suitably used in automobiles powered by an internal combustion engine. More particularly, the invention relates to a device for treating exhaust gases of internal combustion engines and still more particularly to the thermal shielding of a catalytic converter.

2. Description of Related Art

A conventional device for treating exhaust gases of internal combustion engines, such as a catalytic converter, includes a housing connected to an inlet conduit and an outlet conduit. The housing contains at least one exhaust gas treating body, commonly known as a substrate. The substrate is typically a monolith that possess hundreds or thousands of channels arranged in a honeycomb structure, which serve as exhaust channels through which exhaust gas from the engine flows from an inlet conduit and to an outlet conduit.

The monolith is typically ceramic, but it can also be composed of metal. Substrates are also often coated with an active catalytic layer such as aluminum oxide, platinum, palladium, and/or rhodium. As the exhaust flows through the substrate(s), it interacts with the active catalysts and chemical reactions reduce the pollutants in the exhaust, such as carbon monoxide (CO), hydrocarbons (HCs), and nitrogen oxides (NO or $NO_2$).

Catalytic converters also often include a system to monitor the oxygen level in the exhaust. A sensor located in the catalytic converter measures the oxygen level in the exhaust, and determines whether or not the exhaust system is operating properly and emissions are within acceptable limits.

The exhaust flowing through the catalytic converter is extremely hot (exhaust temperatures may be as high as 1900 degrees Fahrenheit). Excessive housing temperatures potentially pose a danger to the automobile itself and the environment, potentially causing undesired thermal incidents. Therefore, catalytic converters often contain insulation and/or shielding to reduce the housing temperature or exposure of other components.

Catalytic converters are known to possess internal shields welded to the housing inner surface for certain applications. However, it is difficult to successfully weld a shield to the housing, when the outer housing is one solid piece instead of two pieces connected together. Additionally, insulation material can interfere with the welding process.

Also known are catalytic converters with internal shields installed in the housing by the process of forming the housing. During forming, the internal shield is positioned in its desired location, and part of the housing is deformed such that the cross-sectional contour of the housing is not uniform in the axial direction in the area proximal to the internal shield. This deformation prevents the internal shield from moving in the axial direction of the catalytic converter. One disadvantage to forming is that the sensor, sensor boss, housing opening, internal shield, or other components may be damaged during the process. This problem is especially prevalent where the sensor is located along the area proximal to the internal shield.

The prior art further discloses a catalytic converter with one continuous piece of insulation surrounding the substrate(s) and the internal shield. Using one piece of insulation may cause problems during manufacturing because it may require the manufacturer to insert all of the elements (the insulation, the substrate(s), and the internal shield) into the housing all at once. Additionally, it is more difficult to achieve a tight interference fit for both the coupling between the shield and insulation and the coupling between the substrate(s) and insulation if the same insulation is used for both applications.

In view of the above, it is clear that an emission control device housing with a uniform cross-sectional contour in the axial direction in the area proximal to the internal shield would be advantageous. Additionally, insulation that does not require the manufacturer to simultaneously install many elements into the housing would be advantageous.

BRIEF SUMMARY OF THE INVENTION

In overcoming the above and other disadvantages and limitations of the prior art, the present invention provides a catalytic converter in which an insulation material supports the internal shield to the housing of the catalytic converter. This is done without requiring deformation of the housing itself to restrict axial movement of the shielding located therein. In achieving the above, the present invention provides an exhaust gas treatment device, for an internal combustion engine, having a housing defining an internal chamber located between an inlet on one end and outlet on the opposing end. Located within the chamber, between the inlet and the outlet, is an exhaust gas treating body. While two are utilized in the preferred embodiment, there need only be at least one exhaust gas treatment body. This body, the substrate, is chemically coated so as to react with the exhaust gases and thereby reducing the amount of undesirable material in the exhaust gas when it exits the treatment device. Also located within the chamber of the housing is an internal shield. The internal shield is retained and engaged with the housing by means of a support material that radially surrounds the internal shield. This support material is preferably an insulation material. In the present invention, the support material between the internal shield and the housing is in a frictional engagement with both the housing and the internal shield and as such, this interference or frictional engagement is what is utilized to retain the internal shielding to the housing.

Accordingly, in one aspect, the present invention is an exhaust gas treatment device for an internal combustion engine comprising a housing having portions defining an inlet, an outlet and an interior chamber between said inlet and said outlet; at least one exhaust gas treating body located between said inlet within said chamber and said outlet; a first support material located radially between an inner surface of said housing and said at least one exhaust gas treating body; an internal shield located within said housing; a second support material radially surrounding said internal shield and located between said inner surface of said housing and said internal shield, said second support material retaining said internal shield in engagement within said housing wherein said housing exhibits a substantially constant cross sectional area along its length in a region proximal to said internal shield.

The above and other objects, features, and advantages of the present invention will be made more apparent from the following description of the preferred embodiments, with reference to the accompanying drawings.

DETAILED DESCRIPTION OF THE INVENTION

Figure 1:
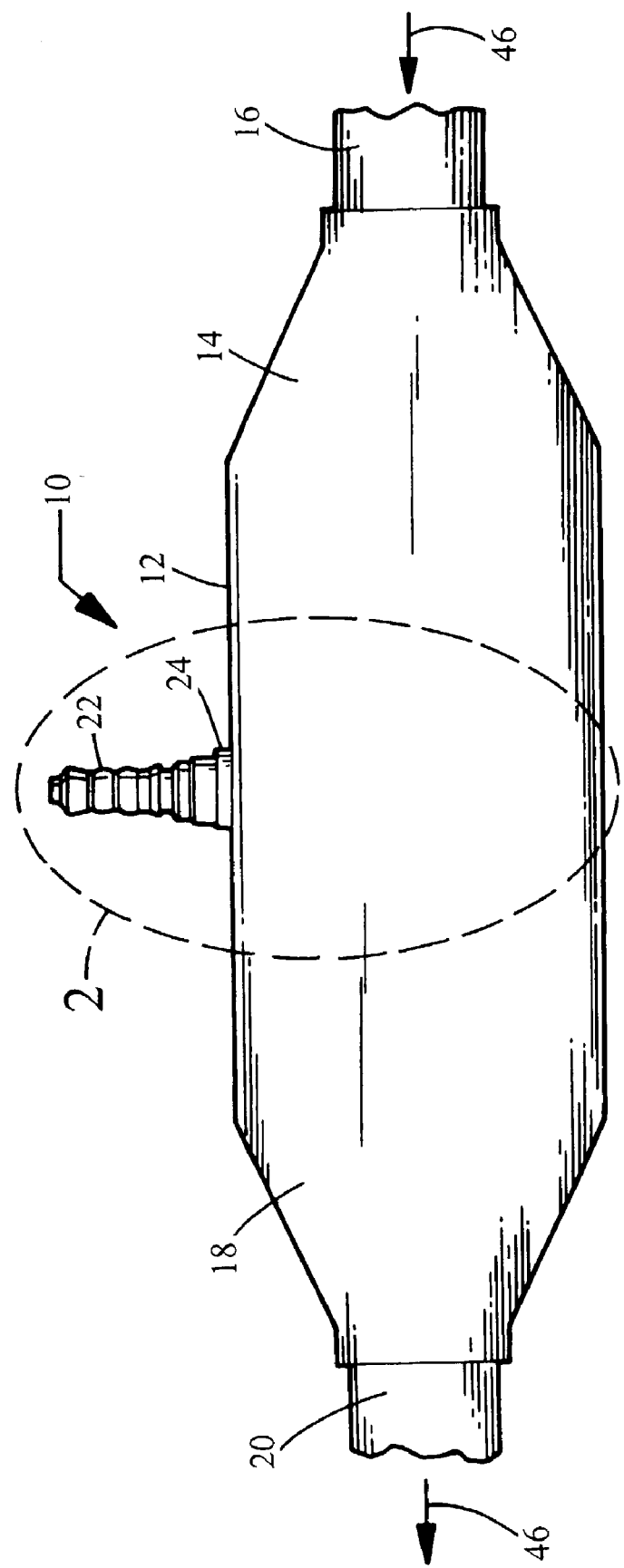
FIG. 1 is a side view of an exhaust gas treatment device embodying the principles of the present invention for treating exhaust gases of internal combustion engines.

Referring now to the drawings, a device for treating the exhaust gas of internal combustion engines, specifically a catalytic converter 10, is shown in FIG. 1. The catalytic converter 10 includes a housing 12 connected at one end to an inlet conduit 16 and at another end to an outlet conduit 20. An inlet zone 14 and an outlet zone 18 are contained within the housing 12, each located at an axial end of the catalytic converter 10. The housing 12 can be made of any type of commonly used metal or other rigid material, but it is preferably made of AK Steel 18CrCb steel (manufactured by AK Steel Corporation, Middletown, Ohio), 409SS, 441SS, or 439SS steel. The exhaust gas 46 flows from the inlet to the outlet through the catalytic converter 10.

Figure 2:
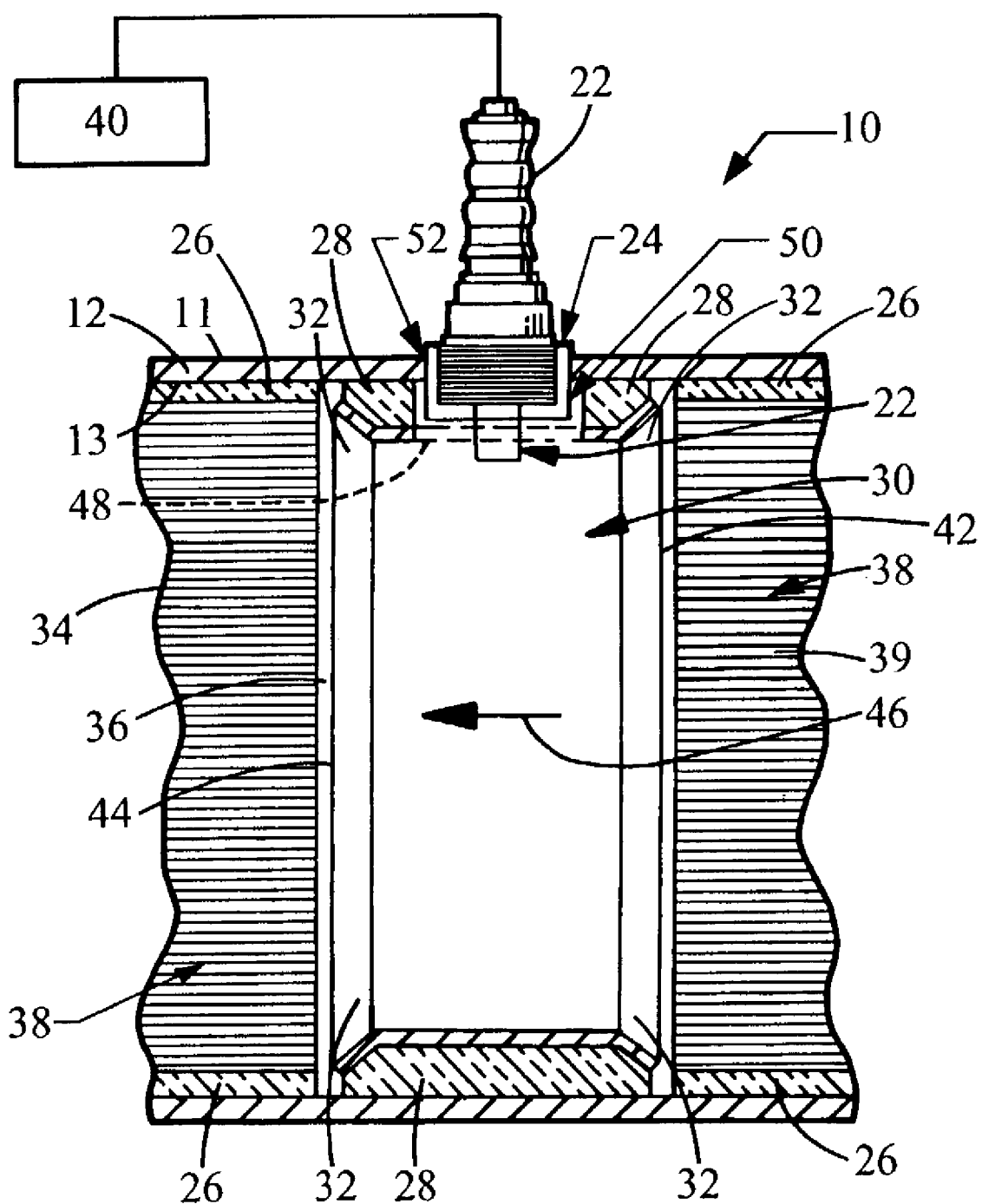
FIG. 2 is an enlarged view of a portion of the device seen in FIG. 1 and generally encircled within Line 2, with portions in section and broken away.

As seen in the preferred embodiment of FIG. 2, the housing 12 contains at least one substrate 38, which reacts with exhaust gas 46 to reduce pollutants in the exhaust gas 46. The preferred embodiment of a substrate 38 is a monolith 39 with hundreds or thousands of channels 34 arranged in a honeycomb structure (although triangular, rectangular, ovalar and circular structures could be employed) and serving as conduits for the exhaust gas 46. Other structural shapes, as long as they readily permit the flow of exhaust gas there through, may also be used instead of the honeycomb type monolith 39. The preferred embodiment shown in FIG. 2 includes two substrates 38 (one toward the inlet and one toward the outlet), but the catalytic converter 10 may have more or less than two substrates 38. The substrates 38 are preferably made of ceramic, but they can also be made of another material, such as metal.

Exhaust gas 46 flows through the inlet conduit 16, into the inlet zone 14, and through the channels 34 of the substrates 38. The channels 34 are coated with an active catalytic layer such as aluminum oxide, platinum, palladium, and/or rhodium. As the exhaust gas 46 flows through the channels 34, it interacts with the active catalysts and a chemical reaction reduces the pollutants, such as carbon monoxide (CO), hydrocarbons (HCs), or nitrogen oxides (NO or $NO_2$), in the exhaust gas 46.

In the preferred embodiment, after the exhaust gas 46 flows through the first substrate 38, it flows through a conduit formed by an internal shield 30 and passes a sensor 22. Although the preferred method includes a sensor 22, it is not always required. The sensor 22 is held in place by a sensor boss 24, which is connected to the housing 12. The exhaust gas 46 next preferably flows through a second substrate 38, into the outlet zone 18 and through the outlet conduit 20.

As seen in FIG. 2, the sensor 22 located in the catalytic converter 10 measures the oxygen level in the exhaust gas 46, and, in response to a signal therefrom, a controller 40 accordingly determines the effectiveness of the catalysts.

The housing 12 contains support material and an internal shield 30, located either before or after the substrate 38 or between the two substrates 38 (in the illustrated embodiment). Both the support material and the internal shield 30 together operate to reduce the temperature of the housing 12, particularly the temperature of the housing outer surface 11. Additionally, they operate to reduce the excessive gas pressure drop caused by the sudden flow expansion in the region between the substrates 38.

The preferred embodiment includes two support materials, a first support material 26 and a second support material 28. The first support material 26 is located between the substrate 38 and the housing inner surface 13, and it is preferably composed of an intumescent mat, which expands, once the initial thermal cycle reaches the appropriate temperature for the intumescent, and thereafter remains in the expanded state. Some preferred types of intumescent mat used as the first support material 26 are Interam™ 100 or Interam™ 550, manufactured by 3 M™. However, the first support material 26 can be made from other types of materials, such as a non-intumescent mat or a wire mesh. The first support material 26 and the substrates 38 are fixedly held in place in an interference fit with the housing 12, which becomes a tighter fit after the first support material 26 expands under heat.

The second support material 28 is located between the housing inner surface 13 and the internal shield 30, and it is preferably composed of an intumescent mat, which expands, once the initial thermal cycle reaches the appropriate temperature for the intumescent, and thereafter remains in the expanded state. Some preferred types of intumescent mat used as the second support material 28 are Interam™ 550 or Interam™ 900HT, manufactured by 3M™. However, the second support material 28 can be made from other types of materials, such as a non-intumescent mat or a wire mesh. The second support material 28 and the internal shield 30 are fixedly held in place relative to one another and the housing 12 via an interference fit between the second support material 28 and the housing 12 and between the second support material 28 and the internal shield 30, which becomes a tighter fit after the second support material 28 expands during the initial thermal cycle and upon reaching the appropriate temperature for the intumescent. The second support material 28 is preferably only located in the area axially between the ends of the internal shield, designated as a first edge 42 and a second edge 44.

The internal shield 30 can be made of any type of metal or other rigid material, but it is preferably made of AK Steel 18CrCb steel, 409SS, 441SS or 439SS steel. The internal shield 30 preferably contains two flanges 32, although if desired one or both flanges 32 may be eliminated. The flanges 32 are preferably located such that the internal shield first edge 42 and the internal shield second edge 44 are the outboard edges of the flanges 32. The flanges 32 are also preferably angled, with respect to a constant diameter center section of the internal shield 30, toward the housing 12 such that the distance between the flanges 32 and the housing inner surface 13 is shorter than the distance between the internal shield 30 and the housing inner surface 13. In addition. the internal shield 30 (i.e., the first and second internal shield edges) are axially spaced from the substrates by a predetermined gap width 36.

The sensor boss 24 is attached to the housing 12 via a housing opening 52 and is preferably axially located in the housing 12 at a point located between the internal shield first edge 42 and the internal shield second edge 44. The sensor 22 is mounted within the sensor boss 24 such that it can monitor the flow of the exhaust gas 46 and the internal shield 30 is provided with a shield aperture 48 having a diameter at least as large as the cross-sectional diameter of the sensor 22. During installation, the internal shield 30 is aligned such that the sensor 22 extends through the shield aperture 48 into the exhaust gas flow.

The catalytic converter 10 may be manufactured using a variety of known methods such as, but not limited to, shrinking, stuffing, clamshell, tourniquet, or shoebox method. In a shrinking method, the substrate(s) 38, the first support material 26, the internal shield 30, and the second support material 28 are first inserted into the housing 12. The housing 12 is then swaged such that the diameter becomes smaller, but the contour of the housing 12 remains substantially constant. The housing 12 is swaged by tightening a plurality of adjacent vise jaws, preferably nine or more. The jaws may be concave in shape such that the contact surface of each jaw is substantially flush with the surface of the housing 12. Various known methods can be used to compress the housing 12.

When manufactured via a stuffing method, the substrate 38 is wrapped with the first support material 26 and inserted into a conical device that compresses the first support material 26 as it is pushed through. The wrapped substrate 38 is then ejected from the compression cone into the housing 12. The substrate 38 and the first support material 26 create an interference fit with the housing inner surface 13. The internal shield 30 is wrapped with the second support material 26 and inserted into the housing 12 in a similar fashion.

In a clamshell method, the housing 12 is comprised of an upper section and a lower section. The two sections are welded together along the axis of the housing 12. In a shoebox method, the housing 12 is similarly comprised of an upper section and a lower section. The two sections fit together in a method that can be likened to that of a shoebox—such that one section fits within the other section.

In a tourniquet method, the first support material 26 is wrapped around the substrate 38, the second support material 28 is wrapped around the internal shield 30, and then the substrate 38 and the internal shield 30 are inserted into the housing 12. Next, the housing 12 is compressively closed around the substrate 38 and the internal shield 30 with a tourniquet strap force. Specifically, the housing 12 is wrapped in a casing which surrounds the periphery of the housing 12 to compressively close the housing 12 around the substrate 38 and the internal shield 30 to a desired compression distance or pressure.

Among the methods described above, the shrinking, stuffing, clamshell, and shoebox methods are the preferred methods because they do not alter the cross-sectional contour of the housing 12. More specifically, the housing 12 of a catalytic converter 10 manufactured with these methods has a uniform cross-sectional contour in the axial direction in the area proximal to the internal shield 30. The uniform cross-sectional contour minimizes potential damage to elements such as the sensor 22, the sensor boss 24, the housing opening 52, the internal shield 30, and other components.

During the preferred methods of manufacturing the catalytic converter 10, the second support material 28 is wrapped around the radial surface of the internal shield 30. The second support material 28 may contain a material opening 50 at least as large as the cross-sectional diameter of the sensor 22, positioned such that the material opening 50 and the shield aperture 48 are substantially aligned. In one preferred method, the material opening 50 is formed before the second support material 28 is wrapped around the internal shield 30, and the material opening 50 is aligned with the shield aperture 48 during the wrapping process. In another preferred method, the second support material 28 is wrapped around the internal shield 30, and the material opening 50 is formed after wrapping in a location substantially proximal to the shield aperture 48. Although these are the preferred methods of connecting the second support material 28 and the internal shield 30, other methods may be used.

While this invention has been described in terms of certain embodiments thereof, it is not intended to be limited to the described embodiments, but only to the extent set forth in the claims that follow.

We claim:

1. An exhaust gas treatment device for an internal combustion engine, comprising;
    a housing having portions defining an inlet, an outlet and an interior chamber between said inlet and said outlet;
    a first exhaust gas treating body and a second exhaust gas treating body located between said inlet within said chamber and said outlet;
    a first support material located radially between an inner surface of said housing and said first exhaust gas treating body;
    an internal shield located within said housing, said internal shield being disposed between said first and second exhaust gas treating bodies;
    a second support material radially surrounding said internal shield and located between said inner surface of said housing and said internal shield, said second support material retaining said internal shield in engagement within said housing; and
    a third support material located radially between an inner surface of said housing and said second exhaust gas treating body;
    wherein said housing exhibits a substantially constant cross sectional area along its axial length in a region proximal to said internal shield.

2. A device as set out in claim 1 wherein said second support material has a second axial length, said internal shield has a first axial length, and said second axial length being not greater than said first axial length.

3. A device as set out in claim 1 wherein said first support material and said third support material do not extend into areas radially between said internal shield and said housing.

4. A device as set out in claim 1 wherein said first support material and said third support material are axially restricted to areas radially adjacent to said first exhaust gas treating body and said said second exhaust gas treating body, respectively.

5. A device as set out in claim 1 wherein said second support material is in an interference fit between said internal shield and said housing.

6. A device as set out in claim 1 wherein said first support material and said third support material are in an interference fit between said housing and said first exhaust gas treating body and said second exhaust gas treating body, respectively.

7. A device as set out in claim 1 wherein said internal shield includes at least one flared axial end.

8. A device as set out in claim 1 wherein said at least one flared axial end is radially outwardly flared.

9. A device as set out in claim 1 wherein said first support material retainingly engages said first exhaust gas treating body with said housing, and wherein said third support material retainingly engages said second exhaust gas treating body with said housing.

10. A device as set out in claim 1 further comprising a sensor mounted to said housing and extending through said housing, said second support material and said internal shield, said sensor terminating at a location within an internal diameter of said internal shield and within a flow path of exhaust gases.

11. A device as set out in claim 1 wherein said second support material is a thermal insulation material.

12. A device as set out in claim 1 wherein said first support material is axially spaced from said second support material.

13. A device as set out in claim 1 wherein said third support material is axially spaced from said second support material.

14. A device as set out in claim 1 wherein said internal shield is axially spaced from said first exhaust gas treating body and said second gas treating body.

15. A device as set out in claim 1 wherein said internal shield is axially spaced from said at first support material and said third support material.

\* \* \* \* \*